United States Patent [19]

Ohba et al.

[11] 4,441,128
[45] Apr. 3, 1984

[54] ROTARY TRANSDUCER HEAD ASSEMBLY

[75] Inventors: Takeo Ohba; Hirohisa Koga, both of Atsugi, Japan

[73] Assignee: Sony Corporation, Tokyo, Japan

[21] Appl. No.: 363,086

[22] Filed: Mar. 29, 1982

Related U.S. Application Data

[63] Continuation of Ser. No. 156,490, Jun. 4, 1980, abandoned.

[30] Foreign Application Priority Data

Jun. 9, 1979 [JP] Japan .................................. 54-72541
Jun. 9, 1979 [JP] Japan .................................. 54-72542

[51] Int. Cl.³ .............................................. G11B 21/02
[52] U.S. Cl. ..................................... 360/75; 360/109; 310/331
[58] Field of Search ..................... 360/109, 70, 75, 77, 360/104; 310/331, 332

[56] References Cited

U.S. PATENT DOCUMENTS 3,890,644  6/1975  Goetzinger et al. ............ 360/109 X
4,188,645  2/1980  Ragle et al. ..................... 360/109 X
4,233,637  11/1980  Kubota ................................. 360/109

FOREIGN PATENT DOCUMENTS 1328931  9/1973  United Kingdom .

Primary Examiner—John H. Wolff
Attorney, Agent, or Firm—Lewis H. Eslinger; Alvin Sinderbrand

[57] ABSTRACT

A rotary magnetic head assembly for a helical scan video tape recorder comprises a tape guide arrangement including coaxial rotatable and fixed drum portions about which a video tape is helically guided, a pair of substantially parallel bi-morph leaves each secured, at one end, to the rotary drum portion and being both deflectable in the same direction in response to the application of a control signal thereto, and a deflectable member carrying a transducer head and being connected to the opposite free ends of said bi-morph leaves, such deflectable member having at least portions thereof which are elastically flexible and located between the free ends of the bi-morph leaves and the head to deflect in response to deflection of the bi-morph leaves for maintaining the head in proper contacting relation to the tape guided about the drum portions.

7 Claims, 11 Drawing Figures

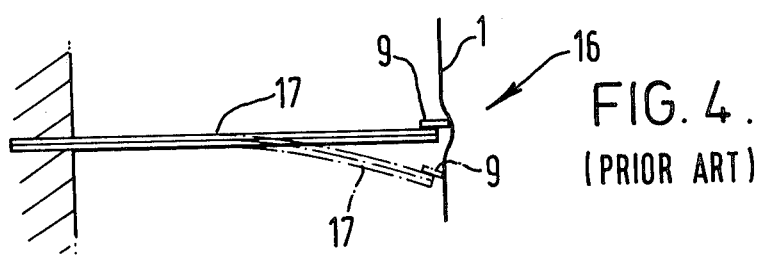
FIG. 4.
(PRIOR ART)
FIG. 5.
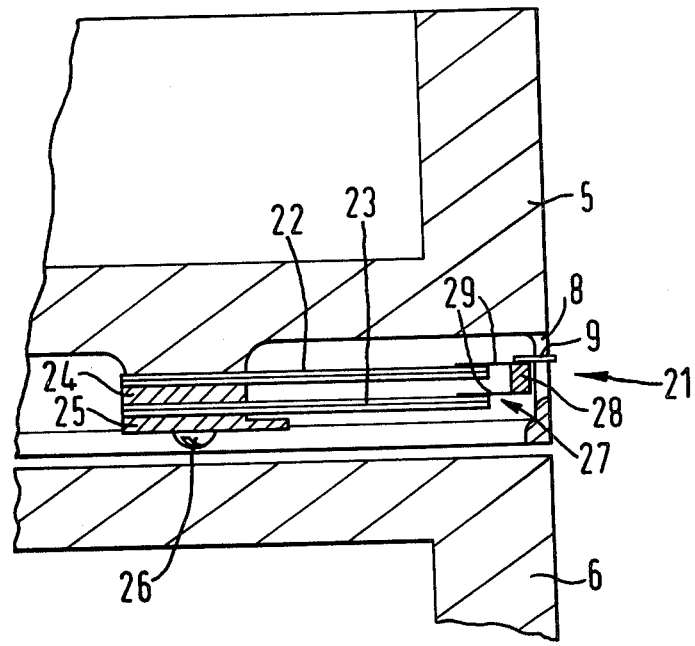

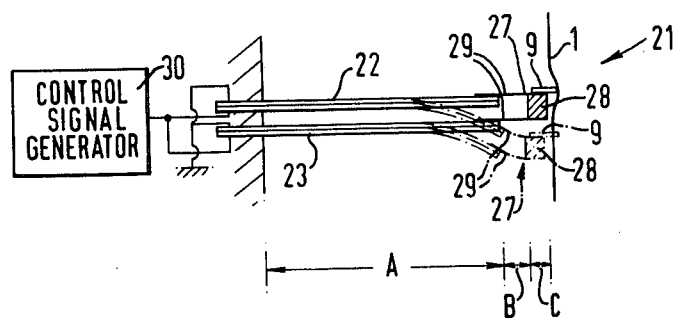
FIG. 6.
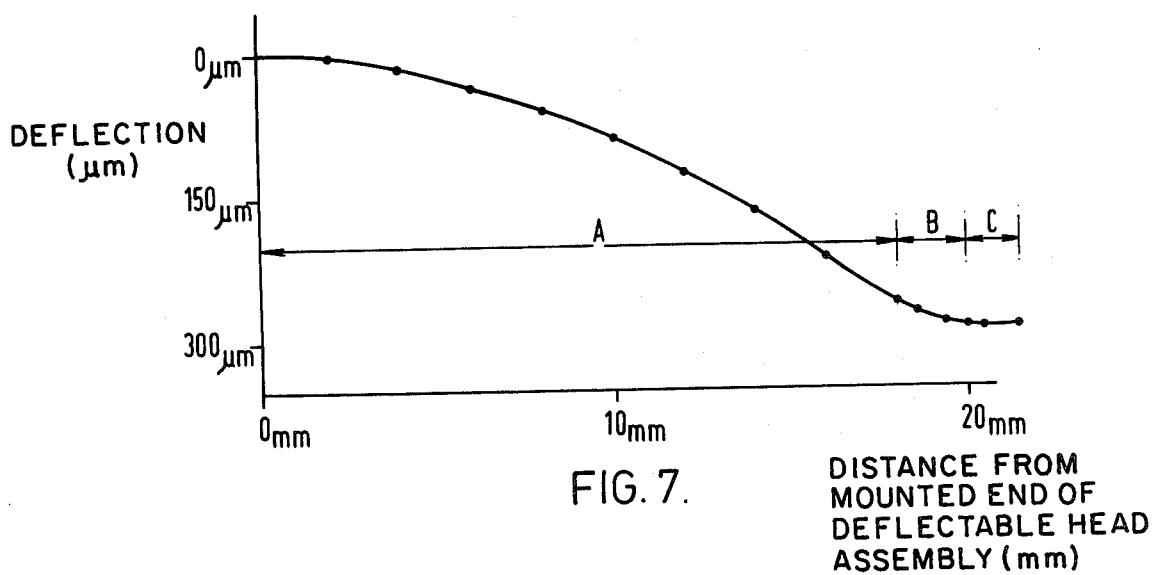
FIG. 7.   DISTANCE FROM MOUNTED END OF DEFLECTABLE HEAD ASSEMBLY (mm)

ROTARY TRANSDUCER HEAD ASSEMBLY

This is a continuation of application Ser. No. 156,490, filed June 4, 1980, now abandoned.

BACKGROUND OF THE INVENTION

1. Field of the Invention

This invention relates generally to rotary transducer or head assemblies, and more particularly, is directed to improved rotary head assemblies for use with automatic tracking systems, for example, in helical scan video tape recorders (HVTRs).

2. Description of the Prior Art

Recently, automatic head tracking systems have been used in HVTRs. Such head tracking systems use a deflectable head mounting assembly on which a magnetic head is mounted for reproducing recorded video signals, and the assembly can be controlled so that the magnetic head scans a video tape alone paths at controllably different angles relative to the length of the video tape. Control of the angle is necessary to keep the magnetic head in accurate alignment with a record track containing the signals to be reproduced, particularly, when the video tape is transported at a speed other than the normal reproduction speed or even when the video tape is stopped for the purpose of still mode reproduction. Thus, such a deflectable head mounting assembly permits maintenance of the required scan angle during so-called special reproduction modes, such as, still, slow, fast and even reverse reproduction modes. Nevertheless, there is a problem with such an assembly which arises because the latter uses a single bi-morph leaf, for example, of piezoelectric ceramic material, with one end of the leaf secured to a rotary member, for example, a rotary portion of the usual tape guide drum, and with the magnetic head being secured to the other end of the leaf. The foregoing bi-morph leaf arrangement is very simple and so long as the deflection angle of the bi-morph leaf is small, good head-to-tape contact is maintained. However, when a more substantial angle of deflection is required, for example, when the video tape is being transported or driven at more than twice the normal reproduction speed or is being transported in the reverse direction, the tape-contacting surface of the magnetic head is no longer aligned with the surface of the video tape and there is consequent deterioration in the quality of the reproduced signal.

OBJECTS AND SUMMARY OF THE INVENTION

An object of the present invention is to provide a deflectable transducer or head mounting assembly which overcomes the foregoing problem associated with the prior art.

More specifically, it is an object of the present invention to provide a deflectable transducer or head assembly which affords improved head-to-tape contact even at relatively large deflection angles.

Another object of the present invention is to provide a deflectable transducer or head mounting assembly, as aforesaid, which incorporates two deflectable members arranged, in effect, in series with the second member carrying a transducer or head.

A further object of the present invention is to provide a deflectable transducer or head mounting assembly which affords improved head-to-tape contact at relatively large deflection angles without unduly complicating the circuitry by which the deflection is controlled.

In accordance with an aspect of this invention, a deflectable transducer head assembly comprises: a first deflectable member, a transducer or head for transducing signal, and a second deflectable member connected with said head and said first deflectable member for mounting said head on the latter, the second deflectable member being deflected relative to the first deflectable member in response to deflections of the latter, with the deflection of the second deflectable member being in the sense to maintain substantial parallelism of the head in respect to itself while moving with the first deflectable member. In an application of the foregoing to a helical scan video signal tape recorder, the first deflectable member is preferably constituted by a pair of substantially parallel bi-morph leaves each secured, at one end, to a rotary portion of the usual guide drum about which the tape is helically wrapped, with both leaves being deflected in the same direction in response to the application of a control signal thereto, and the second deflectable member is connected to the free ends of the bi-morph leaves and has at least portions which are elastically flexible and located between such free ends of the leaves and the head for maintaining the head in proper contacting relation to the tape guided about the drum.

The above, and other objects, features and advantages of this nvention, will be apparent from the following detailed description of illustrative embodiments which is to be read in connection with the accompanying drawings in which corresponding parts are identified by the same reference numerals.

BRIEF DESCRIPTION OF THE DRAWINGS

FIG. 4 diagrammatically illustrates how a rotary head is mounted for deflection in the assembly of FIG. 3;

FIG. 5 is a schematic cross-sectional view of part of a rotary magnetic head assembly according to an embodiment of the invention;

FIG. 6 is a schematic view similar to a portion of FIG. 5, and to which reference will be made in explaining the operation of the embodiment of FIG. 5;

FIG. 7 is a graph for explaining the operation of the embodiment of FIGS. 5 and 6;

DESCRIPTION OF THE PREFERRED EMBODIMENTS

The invention will be described hereinafter as forming part of an HVTR of the single head, omega-wrap type, although the invention is not limited to such application thereof. As is well known, a one inch video tape format called type C is authorized by the SMPTE, and in this format the video tape is wrapped around a tape guide drum assembly through an angle of 340 degrees. HVTRs using the type C format include a sync head and a video head for recording and/or reproducing vertical synchronizing signals and the video portions, respectively, of a television signal. For the purpose of special reproduction modes, such as, still, slow, fast or reverse reproduction, an additional video reproducing magnetic head is provided and supported by a deflectable mounting to provide for movement of that head in the direction transverse to the direction along the record tracks in which the video signals are recorded.

The present invention, and hence the following description, is particularly concerned with the deflectable mounting assembly for such an additional head.

Figure 1:
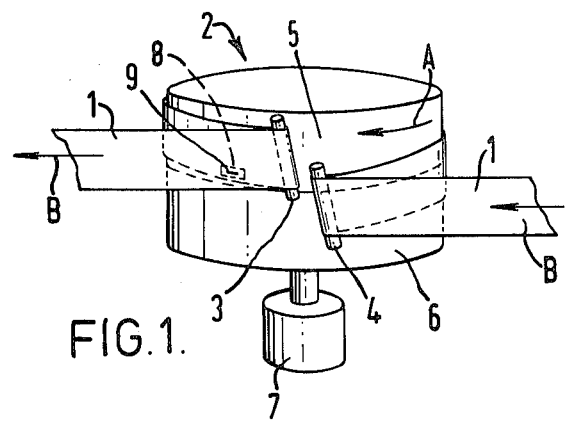
FIG. 1 is a perspective view of a tape guide drum of a helical scan VTR of a type to which this invention may be applied.

Referring now to FIG. 1, it will be seen that, in a typical HVTR, a video tape 1 is wrapped around a tape guide arrangement 2, the angle of wrap being approximately 340 degrees and being determined by a pair of tape guides 3 and 4. The tape guide arrangement 2 also includes an upper rotatable drum 5 and a lower fixed drum 6, the rotatable drum 5 being rotated by a motor 7 at sixty revolutions per second in the case of an NTSC television signal or at such other speed as is appropriate to the television signal being handled, which speed may for example be fifty revolutions per second for a PAL television signal. In FIG. 1, the rotating direction of rotatable drum 5 and the normal tape transport direction are indicated by arrows A and B, respectively. The periphery of rotatable drum 5 is shown to be provided with a head window 8 through which projects a deflectable head 9 to contact video tape 1.

Figure 2:
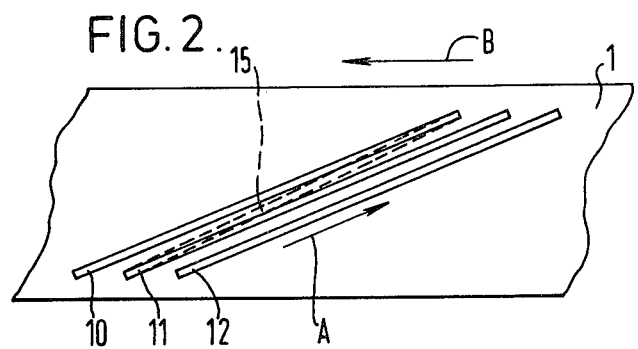
FIG. 2 is a plan view of a section of video tape with recording tracks shown thereon.

FIG. 2 shows a pattern of video recording tracks 10, 11 and 12 on a section of video tape 1, and also a head scanning locus or path 15 on tape 1 and in which head 9 would scan the tape in a non-normal reproducing or playback mode. If it is assumed that video tape 1 is being transported in the normal direction at the normal reproducing speed, then video head 9 may scan track 11. On the other hand, when tape 1 is stopped, video head 9 may follow the illustrated head scanning locus 15 which starts on track 11, crosses the guard band between tracks 11 and 10 and finishes on track 10. Clearly this results in unsatisfactor reproduction and, in order to counteract the same, the video head 9 is made to move at a smaller scanning angle relative to the length of the video tape 1, by suitable control of a deflectable head assembly on which head 9 is mounted, so that video head 9 again only scans track 11.

Figure 3:
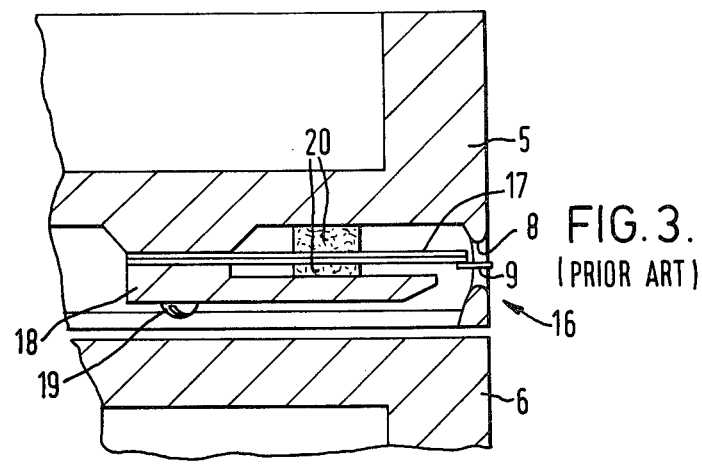
FIG. 3 is a detail, enlarged cross-sectional view of part of a previously proposed rotary magnetic head assembly.

An example of such a previously-proposed deflectable head assembly 16 is shown in FIG. 3, wherein the video head 9 is mounted at the free end of a bi-morph leaf 17. The opposite end portion of bi-morph leaf 17 is secured to the rotatable drum 5 together with a cover member 18 by means of a screw 19. Disposed between the cover member 18 and the body of rotatable drum 5 so as to resiliently grip bi-morph leaf 17 is a rubber block 20 for damping the vibration of the bi-morph leaf. It will be appreciated that movement of head assembly 16 with rotatable drum 5 serves to move head 9 generally in the direction along the record tracks 10, 11, 12 on FIG. 2, whereas the application of an electrical drive signal to bi-morph leaf 17 in a manner that is well known causes such leaf to flex or bend so as to move or deflect head 9 in the direction transverse to the direction along the record tracks.

FIG. 4 illustrates a problem that arises with the deflectable head assembly 16 of FIG. 3. Normally, that is, when a bi-morph leaf 17 is not deflected, the gap of video head 9 is presented perpendicularly to the surface of video tape 1. In other words, the tape-contacting surface of video head 9 is aligned with the surface of video tape 1. However, when bi-morph leaf 17 is flexed or deflected to an extreme position, as indicated in broken lines on FIG. 4, the magnetic gap of the video head 9 is no longer presented perpendicularly to the surface of the video tape 1. In other words, the tape-contacting surface of video head 9 is no longer aligned with the surface of video tape 1, but rather is at an angle to the surface of video tape 1 with subsequent detriment to the quality of the signal reproduced by video head 9.

A deflectable head assembly according to an embodiment of the present invention will not be described with reference to FIG. 5. In this embodiment, video head 9 is mounted on a deflectable head assembly 21 comprising a pair of bi-morph leaf 22 and 23 extending parallel to each other and spaced apart, at one end, by a spacer 24. The leaves 22 and 23 and spacer 24 are secured, together with a cover member 25, to the body of rotatable drum 5 by a screw 26. Secured to the free ends of bi-morph leaves 22 and 23 is a head mounting member 27 to which the video head 9 is attached. As hereinafter indicated, head mounting member 27 is self-deflectable, that is, member 27 deflects relative to leaves 22 and 23 in response to electrically induced deflection of the latter. The head mounting member 27 includes a rigid block portion 28 and an elastic portion constituted by two elastic plates 29 which are respectively rigidly secured to bi-morph leaves 22 and 23. When bi-morph leaves 22 and 23 are deflected by the application of a control or drive signal thereto, as shown in broken lines on FIG. 6, elastic plates 29 are deflected in the opposite direction, because elastic plates 29 are rigidly secured, at one end, to rigid block portion 28 and, at the other end, to bi-morph leaves 22 and 23. As indicated in broken lines on FIG. 6, the effect of this self-deflecting action of head mounting member 27 is to maintain the magnetic gap of video head 9 in substantially perpendicular relation to the surface of the video tape 1. In other words, the tape-contacting surface of video head 9 remains aligned with the surface of video tape 1 when bi-morph leaves 22 and 23 are deflected in response to the control or drive signal supplied by a control signal generator 30.

FIG. 7 shows an experimentally determined bending curve of an example of the deflectable head assembly 21. In FIGS. 6 and 7, the dimensions A, B and C represent the lengthwise dimensions of bi-morph leaves 22 and 23, of elastic plates 29, and of rigid block portion 28, respectively. In FIG. 7, the abscissas represent distance in the lengthwise direction of the deflectable head assembly 21 and the ordinates represent distances in microns measured from the normal position of the top surface of bi-morph leaf 22 and head mounting member 27. Thus, the measured distance or deflection is zero where bi-morph leaf 22 meets the rotary support or drum 5 on which it is mounted, and the maximum deflection, that is, the deflection measured at head 9, is approximately 280 microns. It will be noted that the shape of the curve in FIG. 7 corresponds to the deflected shape of the deflectable head assembly 21 shown by broken lines on FIG. 6 and indicates that the tape-contacting surface of video head 9 remains aligned with the surface of video tape 1 when bi-morph leaves 22 and 23 are deflected.

In the particular experiment represented on FIG. 7, dimensions A, B and C were 18,2 and 1.5 millimeters, respectively, and an alternating current having an amplitude of 200 volts and a frequency of 60 Hz was applied to bi-morph leaves 22 and 23, so that deflectable head assembly 21 vibrated at 60 Hz.

Figure 8:
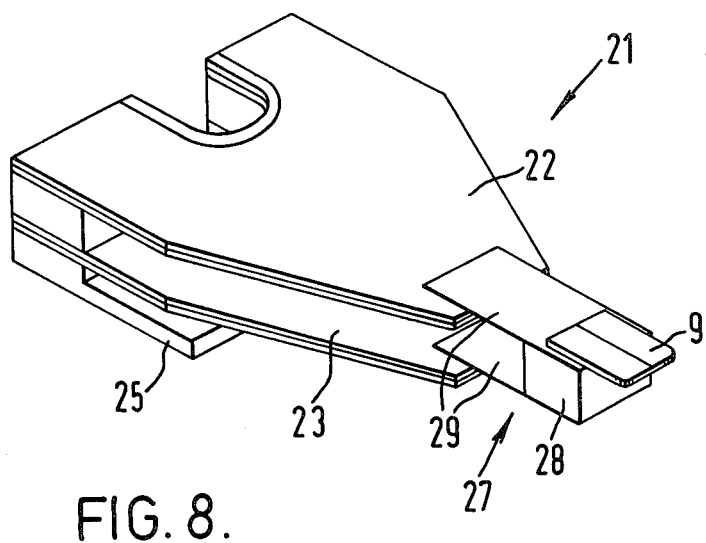
FIG. 8 is an enlarged perspective view showing details of a practical structural example of the embodiment of FIGS. 5 and 6.

FIG. 8 shows a possible practical structural arrangement of deflectable head assembly 21 in greater detail. In particular, the bi-morph leaves 22 and 23 are shown to be shaped so that the outer two-thirds or so of their length, that is, the portions of their lengths extending beyond cover member 25, are of trapezoidal planform with the two opposite edges thereof being inclined inwards at the same angle. The elastic plates 29 of head mounting member 27 are formed of a resilient material, such as, a carbon fiber material, and are secured to the respective bi-morph leaves 22 and 23 by a suitable adhesive. The head mounting member 27 may comprise separately formed elastic plates 29 and a rigid block portion 28 secured to plates 29 by adhesive. Alternatively, a unitary block of material may be built up by stacking a plurality of laminations of carbon fiber material and the illustrated final shape of the head mounting member 27 may be achieved by cutting out material from the block to leave the space between the elastic plates 29.

Figure 9A:
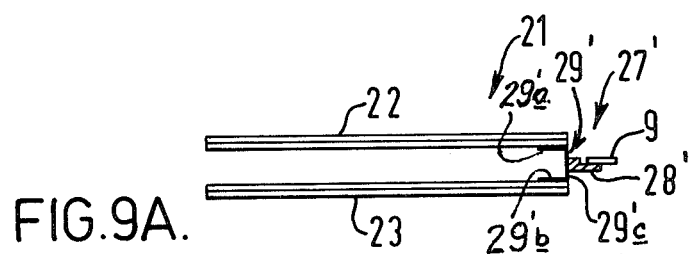
FIGS. 9A, 9B and 9C are schematic views similar to a portion of FIG. 5, but showing other respective embodiments of the invention.
Figure 9B:
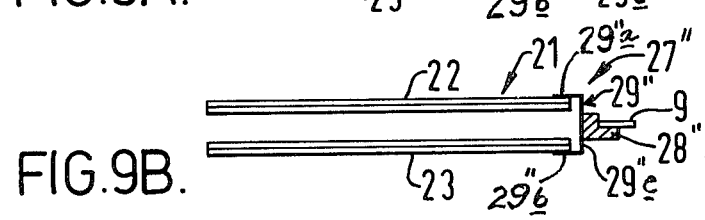
Figure 9C:
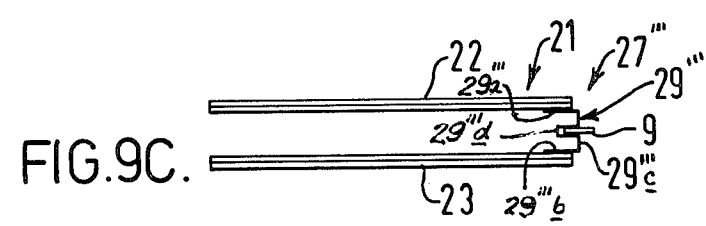

FIGS. 9A, 9B and 9C show other embodiments of the invention which differ from the embodiment of FIGS. 5, 6 and 8 only in respect to details of the head mounting member 27. More particularly, in FIG. 9A, the head mounting member 27' is shown to comprise a generally C-shaped elastic member 29', for example, of carbon fiber material, having substantially parallel end portions 29'a and 29'b suitably fixed, as by adhesive, to the inner or confronting surfaces of bi-morph leaves 22 and 23 at the free end portions of the latter, and a connecting portion 29'c extending between end portions 29'a and 29'b at the free ends of the bi-morph leaves. The head mounting member 27' is further shown to include a rigid block member 28' having the head 9 mounted thereon and being suitably secured to connecting portion 29'c. As shown, rigid block member 28' is dimensioned, in the direction normal to the length of bi-morph leaves 22 and 23, so as to be smaller than the dimension of connecting portion 29'c in that direction, and rigid block member 28' is substantially centered between the free ends of leaves 22 and 23. Thus, with rigid block member 28' secured to connecting portion 29'c of elastic member 29', there remain sections of connecting portion 29'c extending between rigid block member 28' and end portions 29'a and 29'b which remain elastic, that is, are not made rigid by block member 28'. It will be appreciated that, when bi-morph leaves 22 and 23 are deflected in the same direction by the suitable application of a control or drive signal thereto, deflection occurs at the elastic sections of connecting portion 29'c extending generally normal to the length of leaves 22 and 23 from block member 28' to end portions 29'a and 29'b. As a result of such deflection of the elastic sections of connecting portion 29'c, head 9 moves parallel to itself when bi-morph leaves 22 and 23 are deflected in response to the application thereto of the control or drive signal so that the tape-contacting surface of head 9 remains aligned with the surface of a video tape engaged thereby.

The embodiment of FIG. 9B is generally similar to that of FIG. 9A and differs therefrom only in that the C-shaped elastic member 29" of the heat mounting member 27" in FIG. 9B has its connecting portion 29"c dimensioned so that end portions 29"a and 29"b engage against, and are adhesively affixed to the surfaces of bi-morph leaves 22 and 23 which face oppositely away from each other at the free end portions of the leaves. Once again, head mounting member 27" has a rigid block member 28" adhesively secured to connecting portion 29"c of elastic member 29" and being dimensioned to be smaller than connecting portion 29"c in the direction extending between end portions 29"a and 29"b. Thus, the sections of connecting portion 29"c extending beyond block member 28" remain elastic and, as shown on FIG. 9B, sections of end portions 29"a and 29"b may project longitudinally beyond the free ends of leaves 22 and 23, respectively, so as to also be elastically deflectable. Accordingly, when bi-morph leaves 22 and 23 are deflected in response to the application of a control or drive signal thereto, the elastic sections of member 29" extending between rigid block member 28" and the free ends of leaves 22 and 23 deflect in a manner to ensure that the tape-contacting surface of head 9 on rigid block member 28" remains aligned with the surface of a video tape engaged therewith.

Referring now to FIG. 9C, it will be seen that the head mounting member 27''' according to the embodiment of the invention there illustrated consists essentially of an elastic member 29''', for example, of carbon fiber material, which is generally similar to the elastic member 29' described above with reference to FIG. 9A in that member 29''' similarly has end portions 29'''a and 29'''b fixed, as by adhesive, to the inner surfaces of bi-morph leaves 22 and 23 at the free end portions of the latter, and a connecting portion 29'''c extending between the free ends of the leaves. However, at the middle of connecting portion 29'''c, elastic member 29''' is formed with a bight 29'''d in which head 9 is adhesively fixed. Thus, a rigid block member, as at 28, 28' or 28" on FIGS. 8, 9A and 9B, respectively, is absent from the head mounting member 27''' of FIG. 9C. However, it will be appreciated that, when bi-morph leaves 22 and 23 are deflected by the application of a control or drive signal thereto, the sections of connecting portion 29'''c of elastic member 29''' extending between head 9 and the free ends of leaves 22 and 23 deflect or flex for maintaining the tape-contacting surface of head 9 in alignment with the surface of a video tape engaged thereby.

In the above-described embodiments of the invention, each of the leaves 22 and 23 is a piezoelectric ceramic device formed by stacking or laminating two monomorph leaves. However, as an alternative to such arrangement, one of the bi-morph leaves 22 and 23 can be replaced by an elastic plate which extends parallel to the remaining bi-morph leaf and will follow the defection imposed on such remaining bi-morph leaf 22 or 23 by the signal from the control signal generator 30 of FIG. 6.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention, as defined by the appended claims.

What is claimed is:

1. A rotary magnetic head assembly for a helical scan video tape recorder, comprising:

a tape guide arrangement including a cylindrical drum having a rotary head support associated therewith and rotating about the central axis of said drum, and means for helically guiding a video tape about said drum, first and second bi-morph leaves disposed in substantially parallel, spaced apart planes and extending generally in radial directions in respect to said axis of the drum, said bi-morph leaves being both deflectable in the same direction out of said planes in response to the application of a control signal thereof, means rigidly securing radially inner end portions of said first and second bi-morph leaves to said rotary head support so that said planes of the bi-morph leaves, when the latter are at rest, are substantially perpendicular to said axis, a transducer head, and a deflectable member carrying said head and being connected to the radially outer ends of said bi-morph leaves for positioning said head in proper contacting relation to the tape guided about said drum, said deflectable member having first and second end portions secured to said radially outer ends of the first and second bi-morph leaves, respectively, and a connecting portion extending between said first and second end portions and carrying said heat at a radial distance from said radially outer ends of the bi-morph leaves which is short relative to the extent of said bi-morph leaves, said deflectable member having elastically flexible portions at least at junctions of said first and second end portions with said connecting portion, and said elastically flexible portions deflecting in response to deflection of said bi-morph leaves for maintaining said head in said proper contacting relation to the tape.

2. A rotary magnetic head assembly according to claim 1; wherein said deflectable member includes a pair of elastic plates defining said first and second end portions and said elastically flexible portions and respectively extending from said radially outer ends of the bi-morph leaves, and a rigid block portion defining said connecting portion and being secured to said elastic plates with said transducer head being mounted on said rigid block portion.

3. A rotary magnetic head assembly according to claim 2; wherein said elastic plates are of a carbon fiber material.

4. A rotary magnetic head assembly according to claim 2; wherein said elastic plates extend generally in the longitudinal direction of said bi-morph leaves beyond said radially outer ends of the latter.

5. A rotary magnetic head assembly according to claim 1; wherein said deflectable member includes a one-piece elastic element comprised of said end portions secured to said radially outer ends of the bi-morph leaves and said connecting portion which extends substantially normal to the lengths of said bi-morph leaves and has said head mounted thereon.

6. A deflectable transducer head assembly according to claim 5; wherein said deflectable member further includes a rigid block element carrying said head and being secured to said connecting portion of the elastic element.

7. A deflectable transducer head assembly according to claim 5; wherein said head is affixed directly to said connecting portion of the elastic element.

* * * * *